Figure 1:
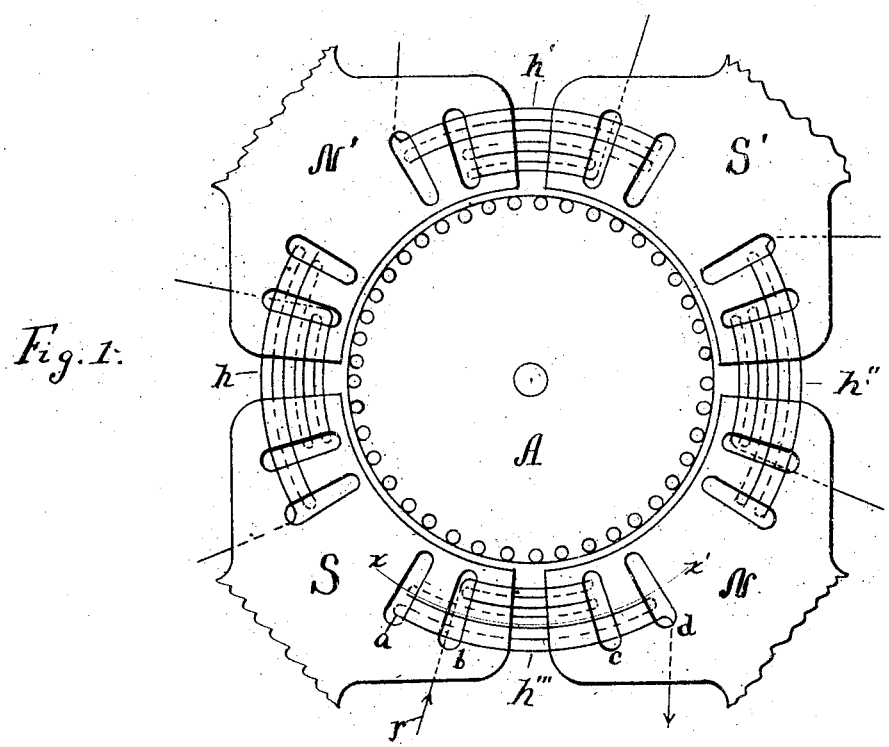

(No Model.)

H. J. RYAN.
DYNAMO ELECTRIC MACHINE OR MOTOR.

No. 502,384. Patented Aug. 1, 1893.

WITNESSES
H. I. Curry.
John H. Howell.

INVENTOR
H. J. Ryan
W. W. Curry
Attorney

UNITED STATES PATENT OFFICE.

HARRIS J. RYAN, OF ITHACA, NEW YORK.

DYNAMO-ELECTRIC MACHINE OR MOTOR.

SPECIFICATION forming part of Letters Patent No. 502,384, dated August 1, 1893.

Application filed September 7, 1892. Serial No. 445,288. (No model.)

*To all whom it may concern:*

Be it known that I, HARRIS J. RYAN, a citizen of the United States of America, residing at Ithaca, in the county of Tompkins and State of New York, have invented certain new and useful Improvements in Dynamo-Electric Generators or Motors, of which the following is a specification, reference being had therein to the accompanying drawings.

My invention relates to improvements in dynamo electric generators and motors. Designers of dynamo electric machinery have experienced much difficulty from the distortion of the magnetic field by the action of the armature currents, such distortion resulting in shifting of the neutral point and consequent sparking at the brushes with all the attendant evils, and also causing a falling off in the electromotive force developed by the machine, due to the reaction of the armature currents on the field magnetization. Many methods have been proposed for remedying these evils, most of them attended with little or no success. The only way of completely neutralizing armature reactions and averting all of the consequent evils, is to balance the magnetizing effects of the armature coils by surrounding them with similar stationary coils producing an opposite magnetizing effect. In applying such coils as these to the actual machine much difficulty is experienced in arranging them so that they shall not have a deleterious effect upon the magnetic circuit of the dynamo. Thus if attempt is made to place them upon the surface of the pole pieces, much difficulty is met with in properly securing them and at the same time the necessary increase in the length of the air gap has an extremely bad effect upon the magnetic circuit, making it necessary to greatly increase the magnetizing force in order to attain the same field strength. Again if the balancing coils are placed in grooves or notches in the pole faces the continuity of the magnetic field under the pole face is thereby broken and fluctuations are caused in the electromotive force developed by the armature conductors crossing this irregular field.

The object of my invention is to provide a means of properly applying coils to dynamo electric machines for balancing armature reactions, and for securing all the benefits arising from the use of such coils without incurring any of the evils which may attend their application. This I accomplish by placing the conductors of the balancing coils in holes entirely beneath the surface of the pole faces and cutting a very thin slot from the hole out to the pole face.

My invention consists then, in placing stationary windings through holes under the surfaces of the pole faces, said holes being slotted out to the pole faces.

My invention consists further in winding these coils with ribbon conductors in the peculiar manner hereinafter described.

Figure 2:
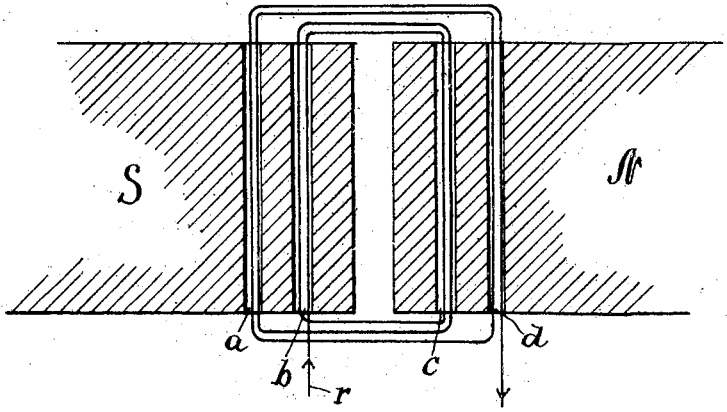

Referring to the accompanying drawings, in which the same letters refer to the same parts, Figure 1. is an end view of the pole pieces and armature of a four pole dynamo electric machine to which my invention is applied. Fig. 2. is a sectional view on the line $x$ $x'$ showing the method of winding the coils.

S, N, S' and N' of Fig. 1 are the pole pieces and A the armature.

$a, b, c, d$, &c., are the holes through the pole pieces. $h\, h'$, &c., are the coils wound through the holes. These holes may be circular or rectangular or oval or whatever shape will best accommodate the conductors. The points to be observed in determining the shape and position of the holes are these. They must be of sufficient size to accommodate the required number of conductors in each hole and this in turn will be determined by the ampère turns on the armature. The aggregate cross section of metal between the holes must be as great as the mean cross section of the poles. The holes must be placed back from the pole faces a distance dependent on their width, this distance being such as will permit the magnetic lines flowing around the holes so as to give a uniform distribution of magnetism on the pole faces. The slots from the holes to the pole faces may be as thin as possible, in any case being thinner than the space between the pole face and armature core. The object of these slots being to prevent local magnetic circulation immediately around the conductors through any one hole, the thinnest possible air gap will serve, by its comparatively high reluctance, to practically prevent all such local circulation. The coils may be wound with any suitable conductor, but copper ribbon is preferable. The winding is best applied in as many separate coils as there are pole pieces, each coil embracing one half of two poles. Thus the conductor starting at $r$ in Figs. 1 and 2, passes first up through hole $b$, then across to hole $c$, down and back to hole $b$, up and across to hole $c$, down and across to hole $a$, up and across to hole $d$, down and across to hole $a$, up and across to hole $d$, and finally down to the other end of the coil. If copper ribbon is used for the winding, the various turns of the coil need not cross each other but may be wound over and over as indicated in Fig. 2 thus making a neat and compact winding and one which does not cross the ends of the armature in any way, thereby interfering with the easy removal of the armature. The winding of each coil should embrace one half the holes in each pole piece and the current must circulate through each coil in such a way that it will pass in the same direction through all of the holes of all pole pieces of like polarity and in the opposite direction through the holes of the other pole. The various coils may all be connected in series, and in series with the armature, or the coils may all be in parallel and in series with the armature, or a combination of series and parallel may be used. In choosing any method of connection however the point must be observed that the total number of ampère turns through the pole pieces shall be the same, approximately at least, as the total number of ampère turns on the armature.

The chief advantages resulting from the use of my invention are these:—It is well understood by dynamo designers that the narrower the air space between the armature core and pole pieces of a dynamo the smaller the amount of energy needed to maintain the magnetic field, and consequently the greater will be the efficiency of the machine. Unfortunately, however, the smaller the amount of energy consumed in the field coils, or more properly, the less the magnetic reluctance of the field circuit, the more marked and disastrous will be the effects of armature reactions. One of the chief advantages therefore resulting from the use of balancing coils lies in the fact that it permits the use of a very small air gap, it being perfectly feasible in fact to reduce the air gap between armature core and pole pieces to what is barely sufficient clearance for the free rotation of the armature, the armature winding of course being placed underneath the surface. Now if a small air gap is to be used it is of course essential that the balancing coils should not be placed on the surface of the poles. It is also very objectionable to place them in grooves, because these grooves leave the pole surface irregular and make the magnetic distribution along it broken and discontinuous. This results in producing an intermittent electromotive force in the conductors of the armature and also fluctuations of magnetism in the core which very greatly increases the heating due to hysteresis. The shorter the air gap the more marked and distinct will be these bad effects of course. By the use of my invention all of these bad effects are avoided, and a continuous and even distribution of magnetism along the pole faces is obtained. Thus it is possible by the use of my invention to greatly improve the design of dynamo machinery, by using balancing coils and small air gaps, without incurring any of the evils which might otherwise result from the use of such coils. It is also a very great advantage to have the coils so placed and so wound that they shall be compact and occupy as little space as possible, and especially so that they shall not cross the ends of the armature, since they would thereby greatly interfere with the accessibility of the armature and prevent its removal from the machine. By the use of my invention the coils lie compact against the pole pieces and occupy so little space as to offer no obstruction to the free inspection of the armature and since they do not cross the ends of the armature they do not interfere in any way with the ready removal of the armature from its bearings whenever this becomes necessary.

I do not here lay any claim to the general use of coils applied to dynamo machines for the purpose of balancing armature reactions and averting the attendant evils, and I am aware of the Patents Nos. 333,573 and 406,415, which have been issued to Elihu Thomson and to Andrews and Spencer, and also other patents all bearing on this general subject. I do not here claim anything covered by any of these patents, my invention relating particularly to the method of applying these balancing coils and securing all the advantages attendant upon their use without any of the evils which may result; a thing not heretofore possible with any of the methods described or even suggested by any of the other workers in this particular line.

What I therefore claim as my invention, and desire to cover by Letters Patent, is—

1. In a dynamo electric generator or motor, balancing coils applied for the purpose of overcoming armature reactions, said coils being wound through holes in the pole pieces, substantially as and for the purpose set forth.

2. In a dynamo electric generator or motor, balancing coils applied for balancing armature reactions, each of said coils being wound spirally round and round in one continuous coil, through holes in the pole pieces and with the space between the adjacent poles at the center of said coil, substantially as shown and described.

3. In a dynamo electric generator or motor, balancing coils applied for overcoming armature reactions, each of said coils consisting of a ribbon shaped conductor wound spirally round and round through holes in the pole pieces, in such a way that the separate layers shall nowhere cross each other, substantially as and for the purpose described.

4. In a dynamo electric generator or motor, the combination with the pole pieces, of a series of holes placed transversely beneath the pole surfaces, and conducting coils wound through said holes, substantially as and for the purpose described.

5. In a dynamo electric generator or motor, the combination with the pole pieces, of a series of holes placed transversely beneath the pole surfaces, slots separating the metal between the holes and the pole faces, and conducting coils wound through said holes, substantially as and for the purpose described.

In testimony whereof I affix my signature in presence of two witnesses.

HARRIS J. RYAN.

Witnesses:
   E. L. WILLIAMS,
   HORACE MACK.